United States Patent
Pai et al.

(10) Patent No.: US 7,355,362 B2
(45) Date of Patent: Apr. 8, 2008

(54) POWER SUPPLY WITH PERFORMANCE DISPLAY

(75) Inventors: Ching-Yuan Pai, Taipei Hsien (TW); Jung-Tai Yeh, Taipei Hsien (TW); Hsin-I Yeh, Taipei Hsien (TW)

(73) Assignee: Acbel Polytech Inc., Taipei Hsien (TW)

( * ) Notice: Subject to any disclaimer, the term of this patent is extended or adjusted under 35 U.S.C. 154(b) by 192 days.

(21) Appl. No.: 11/136,673

(22) Filed: May 25, 2005

(65) Prior Publication Data

US 2006/0217905 A1 Sep. 28, 2006

(30) Foreign Application Priority Data

Mar. 7, 2005 (TW) .............................. 94203485 U

(51) Int. Cl.
*H02P 7/00* (2006.01)
(52) U.S. Cl. .................. 318/432; 388/800; 388/907.5; 388/934
(58) Field of Classification Search ................ 388/800, 388/806, 815, 822, 903, 907.5, 917, 934; 318/254, 432, 434
See application file for complete search history.

(56) References Cited

U.S. PATENT DOCUMENTS

| | | | |
|---|---|---|---|
| 5,870,025 A | 2/1999 | Hinohara et al. | |
| 5,963,887 A * | 10/1999 | Giorgio | 702/64 |
| 6,298,449 B1 | 10/2001 | Carter | |
| 6,396,688 B1 * | 5/2002 | Davies et al. | 361/687 |
| 6,487,463 B1 * | 11/2002 | Stepp, III | 700/79 |
| 6,494,381 B2 * | 12/2002 | Bulthuis | 236/49.3 |
| 6,654,894 B2 * | 11/2003 | Kaminski et al. | 713/300 |
| 2002/0067277 A1 * | 6/2002 | Nishimura et al. | 340/635 |
| 2003/0122430 A1 * | 7/2003 | Aldridge et al. | 307/64 |

FOREIGN PATENT DOCUMENTS

| | | |
|---|---|---|
| EP | 0973087 | 1/2000 |
| GB | 2412257 | 9/2005 |
| GB | 2416430 | 1/2006 |
| JP | 61000822 | 1/1986 |

\* cited by examiner

*Primary Examiner*—Rina Duda
(74) *Attorney, Agent, or Firm*—Rabin & Berdo, P.C.

(57) ABSTRACT

A power supply with performance display is disclosed. The computer power supply mainly has a power converter, a control module, and a display. The control module receives and processes the operating signals from the power converter, and then sends those processed signals to a display in a numerical value form. The power supply can be applied in a computer, an adapter, or other electronic products, which is convenient for users to know the operating status of the power converter.

17 Claims, 5 Drawing Sheets

POWER SUPPLY WITH PERFORMANCE DISPLAY

BACKGROUND OF THE INVENTION

1. Field of the Invention

The present invention relates to a power supply with a performance display, and particularly relates to a power supply having a control module and a display to show a real time operating status.

2. Description of Related Art

Most electronic products including computers require direct current for operation, and for the computer, a power converter is generally mounted to transform the external alternating currents to a direct current. As for other electronic products, they often have batteries or adapters to provide direct current. Normally, those power converters or adapters have specifications printed thereon; however, the actual operating characteristics and performance status are not clearly shown from the external appearance. In other words, it is not convenient for users to know the actual operating status especially when more loads are added, such as updating or increasing peripheral equipment. Thus, the safe operation of the devices cannot be definitely protected.

Therefore, the invention provides a computer power supply with a performance display to mitigate or obviate the aforementioned problems.

SUMMARY OF THE INVENTION

The main objective of the present invention is to provide a computer power supply with a performance display that shows operating status of the power converter on a display, such as current signals, power signals, total operation time etc.

The computer power supply with a performance display mainly has a power converter to transform external power supplies; a control module performing as an arithmetic and control unit, which is responsible for processing signals from the power converter and then sending those processes signals to a display; the display is an LCD or LED, whereby the operating status of the power converter is shown in a numerical value form.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
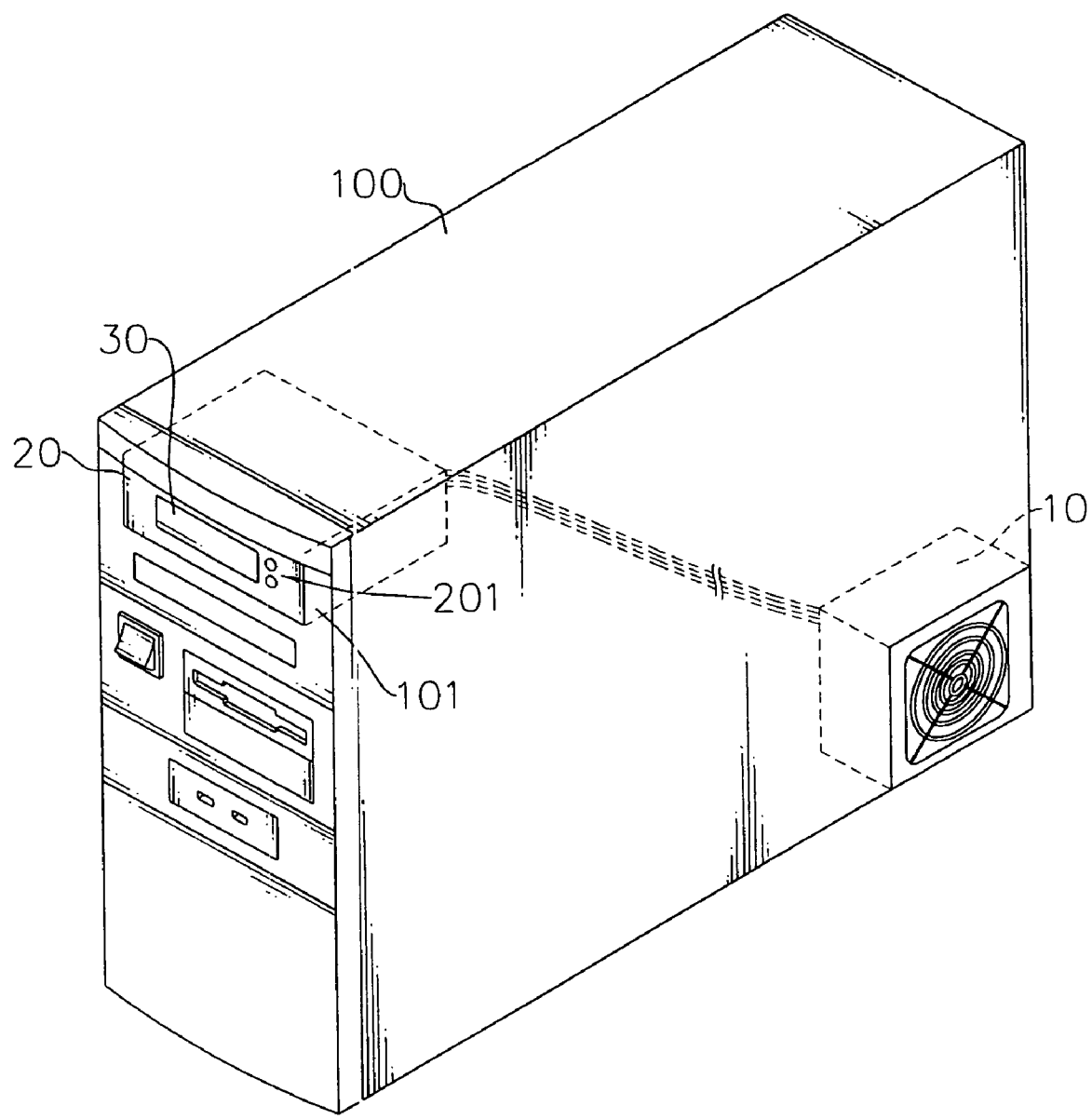
FIG. 1 is a perspective view of a first embodiment of a computer power supply with a performance display in accordance with this invention.

With reference to FIG. 1, a computer power supply with a performance display in a first embodiment has a power converter (10), a control module (20) and a display (30). The power converter is referred to a power supply (10) mounted in the computer chassis (100) to transform the external power into at least one direct current power that can be utilized by the computer. The control module (20), which can be fabricated in the form of a peripheral device, is equipped in the expansion slot (101) of the computer chassis (100), which processes various signals collected from the power supply (10), and then sends those processed signals to the display (30). The display (30) is mounted in the computer chassis (100) to show a real operation status of the power supply (10). The display (30) coupled to the control module (20) is generally an LCD (liquid crystal display) or an LED-based (Light Emitting Diode) display.

The internal structure of the power supply (10) is of a conventional technique so detailed description is omitted.

Figure 2:
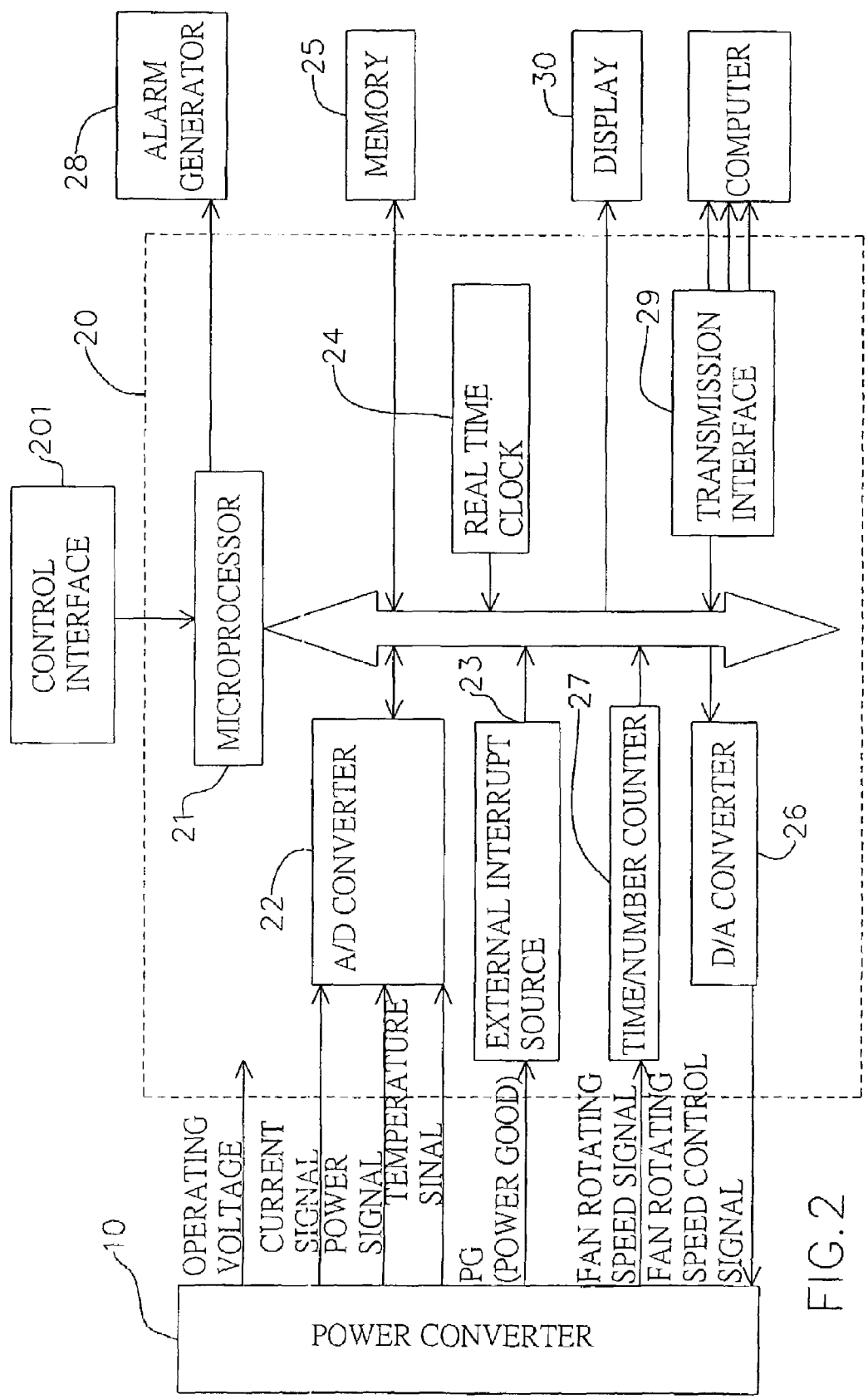
FIG. 2 is a circuit block diagram of the first embodiment of the computer power supply with a performance display in accordance with this invention.

With reference to FIG. 2, the control module (20) of the computer power supply has a microprocessor (21), which is an arithmetic and control unit. An analog to digital (A/D) converter (22) has multiple inputs to receive status signals such as current signals, power signals, temperature signals etc from the power supply (10). The A/D converter (22) further has an output connected to the microprocessor (21) through a first internal bus (not numbered). An external interrupt source (23), a real time clock (24) and a memory (25) are all connected to the microprocessor (21) through the first internal bus, wherein the microprocessor (21) gets a warning signal (referred to the POWER GOOD signal hereinafter) from the power supply (10) through the external interrupt source (23). The real time clock (24) counts the total operation time of the power supply (10). The memory (25) can be an EEPROM (Electrically Erasable Programmable Read Only Memory) or FLASH RAM, and used for storing data such as alarm setting values or total operation time.

When the computer is working, the power supply (10) begins to provide direct current to related computer elements. The microprocessor (21) then gets the current signals, power signals and temperature signals through the A/D converter (22), and those signals are transformed into numerical value in the microprocessor (21) and then shown on the display (30) as reference information for a user who accordingly can handle the status of the power supply (10).

Figure 3:
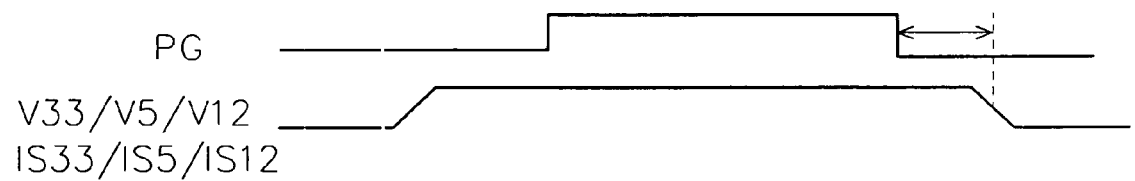
FIG. 3 is an oscillogram showing a time sequence of the power supply of the power converter and the POWER GOOD signal.

The external interrupt source (23) in the control module (20) is responsible for picking the POWER GOOD signal from the power supply (10). Once the external power supply breaks down, or the switch is turned off, or the excessive voltage/current protection occurs, the POWER GOOD signal will have a status change. The status change of the POWER GOOD signal informs the microprocessor (21) via the external interrupt source (23) that the power supply (10) will soon stop providing power and the microprocessor (21) then chooses an appropriate time to store the data in the memory (25). There is a time space between the status change and the power stop moment as shown in FIG. 3. With reference to FIG. 3, the power status V33/V5/V12/IS33/IS5/IS12 of the power supply (10) is illustrated below the warning signal (PG). Prior to the descent of the power status signal, the warning signal (POWER GOOD, PG) has become a low level. Such a pre-warning function can be achieved by, for example, the WT7515 chip fabricated by Weltrend™ company. Therefore the control module (20) will get the status change of the POWER GOOD signal in advance, and the microprocessor (21) stores the related data including the total operation time counted by the real time clock (24) and the alarm setting value to the memory (25).

Figure 4:
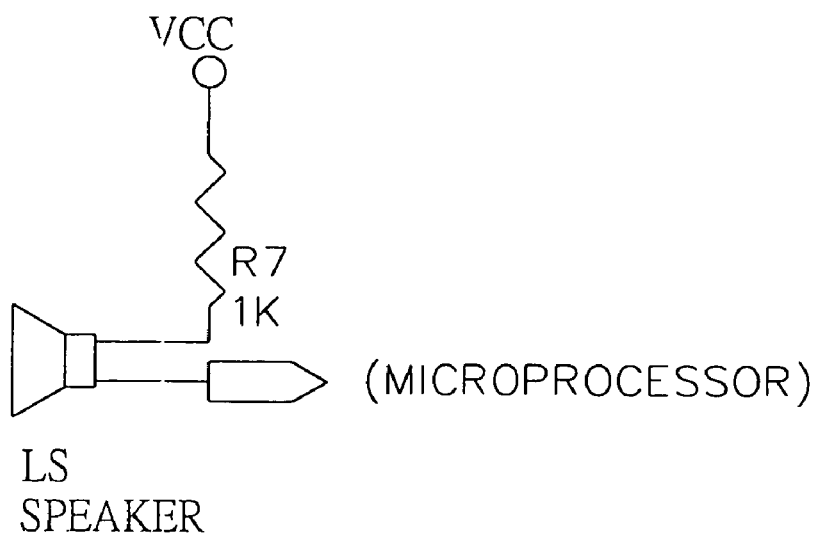
FIG. 4 is a circuit diagram of an alarm generator in accordance with this invention.

Besides, the control module (20) further has a digital to analog (D/A) converter (26), a time/number counter (27), an alarm generator (28), a transmission interface (29) and a control interface (201). The D/A converter (26) connects to the microprocessor (21) through the first internal bus and sends a fan speed control signal to the power supply (10). The time/number counter (27) receives a signal representing the rotation speed (RPM) of a cooling fan of the power supply (10) and has an output connected to the microprocessor (21) through the first internal bus. The alarm generator (28) connected to the microprocessor (21) consists of a buzzer as shown in FIG. 4. When the temperature is excessively high, the buzzer will sound to alert the user. The transmission interface (29) is connected to the microprocessor (21) through the first internal bus. The transmission interface (29) is a serial communication interface such as UART (Universal Asynchronous Receiver Transmission), USB (Universal Serial Bus), or I2C BUS, which performs the data transmission to the computer. The control interface (201) is connected to the microprocessor (21) through a second bus (not numbered). The control interface (20) can be in the form of an external press key set, where the user can control the fan rotation speed through the control interface (20).

The bus between the microprocessor (21) and the display (30) can be a serial bus or a parallel bus performed by, for example, an LCD controller HT1611 manufactured by Holtek™ company. The serial bus mode requires fewer input/output pins (PIO) for the microprocessor (21), but the transmission is comparatively slow. The parallel bus mode uses more input/output pins for the microprocessor (21) and has a comparatively rapid transmission speed. Information about the output current, temperature, fan rotation speed and the total operation time are shown on the display (30).

Figure 5:
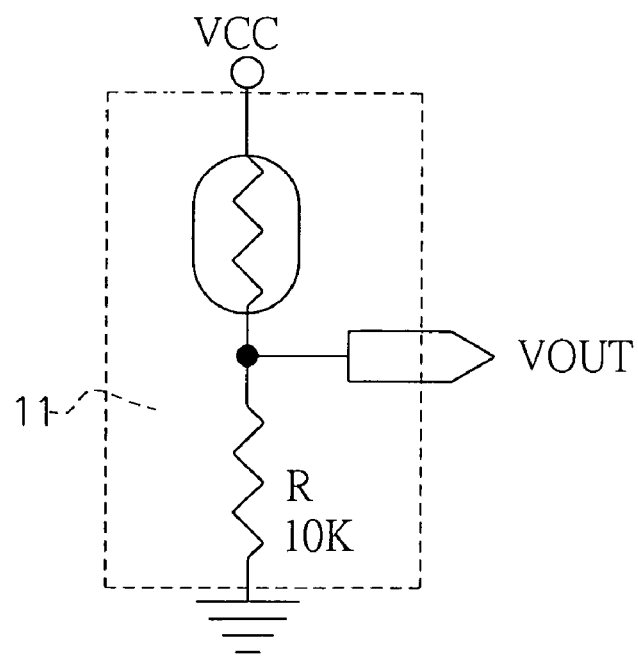
FIG. 5 is a circuit diagram of a temperature sensing circuit in the power converter in accordance with this invention.

The D/A converter (26), the time/number counter (27), the alarm generator (28), the transmission interface (29) and the control interface (201) built in the control module (20) provide more functions:

The power supply (10) has a temperature sensing circuit (11) with an output built therein, as shown in FIG. 5, to detect the internal temperature of the power supply (10), and output the detected temperature signal to the A/D converter (22). The temperature signal is transformed to a numerical value, which is sent to be shown on the display (30). Meanwhile, the microprocessor (21) will determine if the temperature is excessively higher than normal, and if yes, the buzzer will be instructed to sound to alert the user.

The cooling fan is mounted in the power supply (10), and generates a fan rotation speed signal send to the time/number counter (27) in a pulse form. The microprocessor (21) upon the speed signal determines if the rotation speed of the cooling fan is too fast or too slow. If the fan rotation signal is judged abnormal, the microprocessor (21) will give out a control signal to the power supply (10) through the D/A converter (26) to adjust the fan rotation speed. In addition, the fan rotation speed can also be controlled by the user through the control interface (201). In a situation that the output voltage of the D/A converter is 0-12V, and the fan control speed signal generated by the microprocessor (21) is 8 bits, i.e. as many as $2^8=256$ instructions can be made. The quantity of the instructions can be changed by the user, if the quantity of the instructions is set at $2^7=128$, the D/A converter will output a voltage of 6V, i.e. half of the full voltage. The voltage value per bit is calculated by a formula:

$$(12V-0)/256=46.875 mV/bit);$$

the output voltage will control the fan rotation speed.

Data transmission via the transmission interface (29) between the control module (20) and the computer chassis (100) is in a communication protocol. A monitoring application program can be built in the computer operating system and linked with the control module (20). The monitoring application program can give an operating window shown on a desktop display been already connected to the computer, whereby the user can monitor the operation status of the power supply from the desktop display and make instructions for the control module (20) through the transmission interface (29) to determine the fan speed.

Therefore, the control module (20) picks the signals about the operation status of the power supply (10), and then the result is shown on the display (30).

Figure 6:
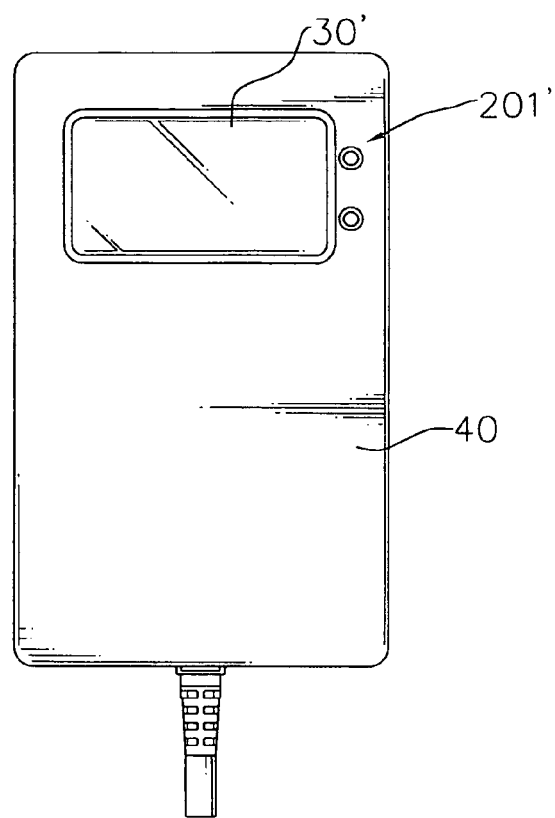
FIG. 6 is a front view of a second embodiment of the power supply with a performance display in accordance with this invention.

With reference to FIG. 6, a power supply with a performance display can also be applied in an adapter (40), which is a second embodiment of this invention. In that case, the adapter (40) serves as a power converter, and a control module is fixed inside the adapter (40). The display (30') is mounted on a case of the adapter (40).

Figure 7:
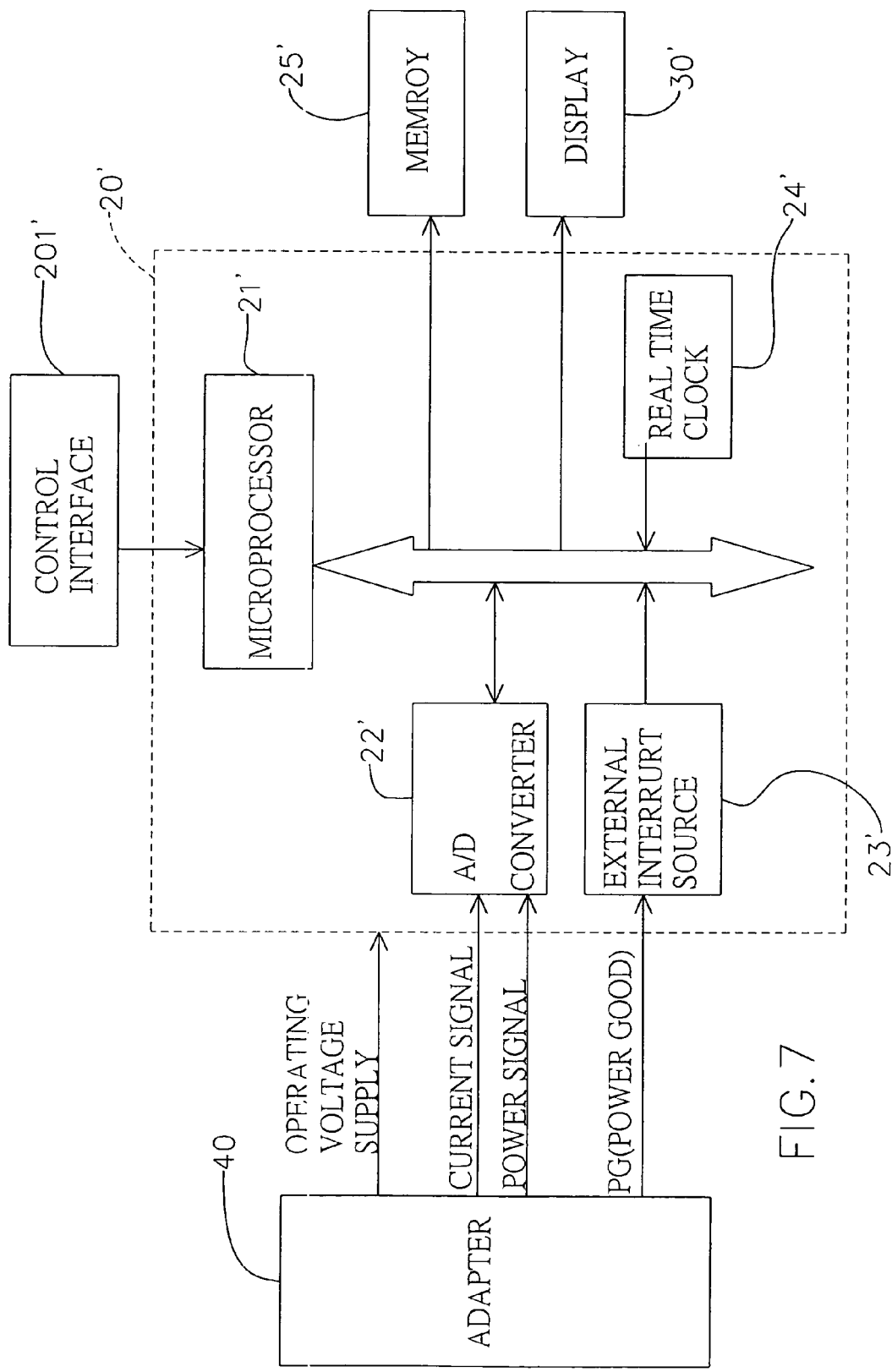
FIG. 7 is a block diagram of a third embodiment of the power supply with a performance display in accordance with this invention.

FIG. 7 shows a circuit block diagram of the power supply with a performance display in the second embodiment. The control module (20') of the power supply includes a microprocessor (21'), an A/D converter (22'), an external interrupt source (23'), a real time clock (24'), a memory (25') and a control interface (201').

The microprocessor (21') performs as an arithmetic and control unit. The A/D converter (22') has multiple inputs that receive current signals, power signals, and temperature signals. The output of the A/D converter (22') is connected to the microprocessor (21') through a third internal bus. The external interrupt source (23') is connected to the microprocessor (21') through the third internal bus, by which the microprocessor obtains the POWER GOOD signal from the adapter (40) through the external interrupt source (23'). The real time clock (24') is connected to the microprocessor (21') through the third internal bus to count the total operation time of the adapter (40). The memory (25') is also connected to the microprocessor (21') to store some alarm setting value and total operation time. The control interface (201') is connected to the microprocessor (21') through a fourth internal bus, which can be in the form of a press key set. In this way, the power supply with a performance display is applied on the adapter (40).

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A power supply with performance display comprising:
   a power converter to transform external power to at least one direct current power;

a control module including (i) an analog to digital (A/D) converter connected to the power converter to receive status signals from the power converter, the status signals including at least one voltage signal that represents an output current of the power converter, and (ii) at least one microprocessor connected to the A/D converter to receive output signals from the A/D converter; and a display connected to the control module to show performance information of the power converter based on the status signals.

2. The power supply with performance display as claimed in claim 1, wherein the control module further includes an external interrupt source that receives a warning signal generated from the power converter, and the control module informs the microprocessor when the warning signal has a status change that occurs prior to power interruption of the power converter.

3. The power supply with performance display as claimed in claim 2, wherein the control module further includes a real time clock to count a total operation time of the power converter.

4. The power supply with performance display as claimed in claim 3, wherein the power converter includes a temperature sensing circuit with an output connected to the A/D converter, and temperature signals outputted from the temperature sensing circuit are processed by the A/D converter and then sent to the microprocessor.

5. The power supply with performance display as claimed in claim 4, wherein:

the power converter further includes a cooling fan that outputs a speed signal representing a rotation speed of the cooling fan; and the control module further includes a time/number counter and a digital to analog (D/A) converter both connected to the microprocessor, wherein the speed signal is received by the time/number counter and further transmitted to the microprocessor so that the microprocessor is able to output a control signal in response to the speed signal to adjust the rotation speed of the cooling fan through the D/A converter.

6. The power supply with performance display as claimed in claim 5, wherein the control module further includes a memory.

7. The power supply with performance display as claimed in claim 5, wherein the control module further includes a transmission interface for data communicating with a computer through a communication protocol.

8. The power supply with performance display as claimed in claim 7, wherein the microprocessor is linked with a monitoring application program built in an operation system of the computer, and provides an operating window shown on a desktop display connected to the computer.

9. The power supply with performance display as claimed in claim 8, wherein the transmission interface is a serial bus.

10. The power supply with performance display as claimed in claim 5, wherein the control module further includes a control interface connected with the microprocessor to control the rotation speed of the cooling fan.

11. The power supply with performance display as claimed in claim 10, wherein the control interface has press keys.

12. The power supply with performance display as claimed in claim 4, wherein the control module further includes an alarm generator connected to the microprocessor.

13. The power supply with performance display as claimed in claim 12, wherein the alarm generator is a buzzer.

14. The power supply with performance display as claimed in claim 6, wherein the memory is an electrically erasable programmable read only memory (EEPROM).

15. The power supply with performance display as claimed in claim 6, wherein the memory is a flash RAM.

16. The power supply with performance display as claimed in claim 5, wherein the display is an LCD.

17. The power supply with performance display as claimed in claim 5, wherein the display is an LED-based display.

* * * * *